L. H. HODGES.
VEHICLE WHEEL.
APPLICATION FILED DEC. 12, 1910.
1,031,933.
Patented July 9, 1912.
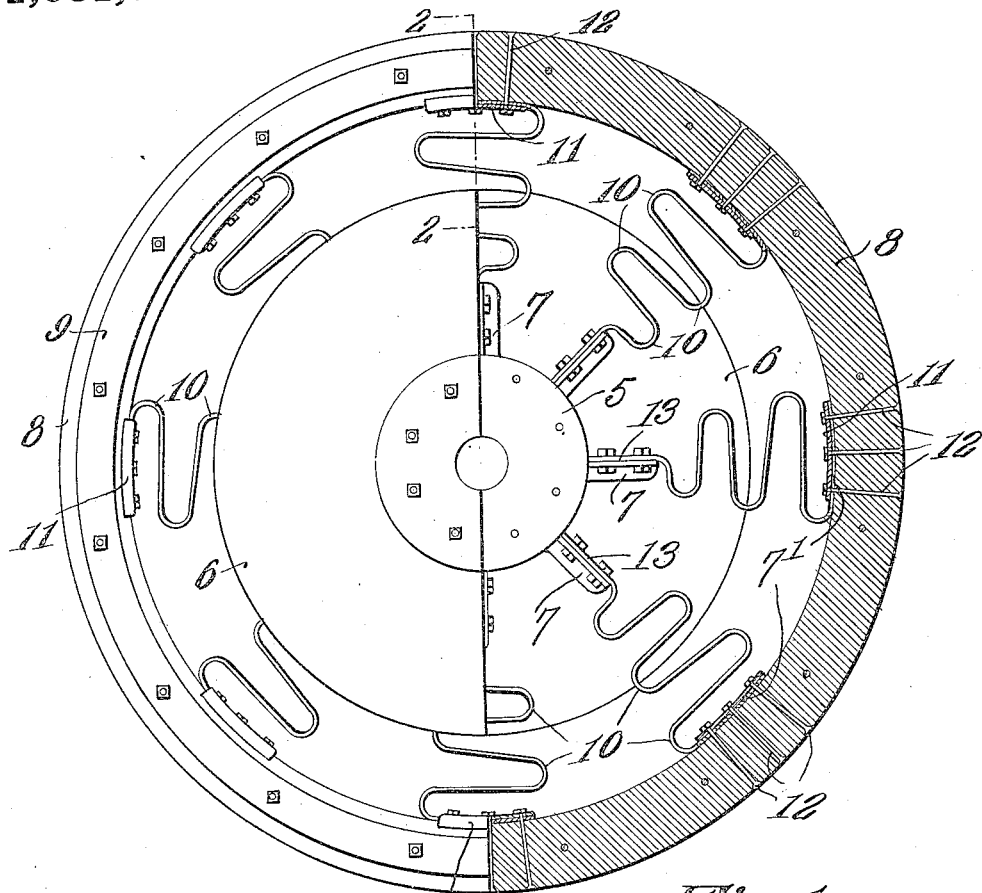
Fig. 1.
Fig. 2.
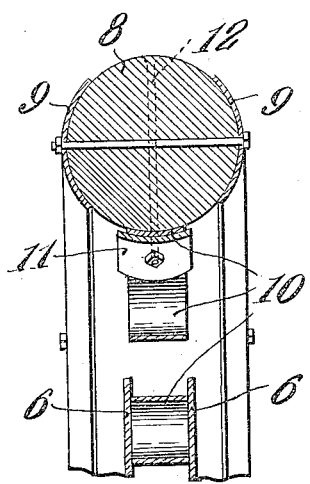
Ludia H Hodges,
Inventor
Witnesses
by
Attorneys

UNITED STATES PATENT OFFICE.

LUDIA H. HODGES, OF SILVERTON, TEXAS.

VEHICLE-WHEEL.

1,031,933.

Specification of Letters Patent. Patented July 9, 1912.

Application filed December 12, 1910. Serial No. 596,800.

*To all whom it may concern:*

Be it known that I, LUDIA H. HODGES, a citizen of the United States, residing at Silverton, in the county of Briscoe and State of Texas, have invented a new and useful Vehicle-Wheel, of which the following is a specification.

It is the object of the present invention to provide an improved construction of vehicle wheel and the invention relates more particularly to that class of such wheels which embody spring spokes designed to take the place of the ordinary pneumatic tires employed upon vehicle wheels having rigid spokes.

One aim of the present invention is to provide a vehicle wheel of the type mentioned in which the rim may yield in a number of directions with respect to the hub so that the wheel will act in a highly efficient manner to absorb shocks due to impact in the line of travel of the vehicle as well as impact in a direction at an angle to the line of travel.

As stated, the wheel embodying the present invention includes, in its structure, spring spokes and it is a further aim of the invention to so construct and arrange these spokes as to render the wheel highly efficient in absorbing shocks coming from all directions.

In the accompanying drawing, Figure 1 is a view partly in side elevation and partly in section illustrating a wheel constructed in accordance with the present invention. Fig. 2 is a vertical sectional view on the line 2—2 of Fig. 1.

In the drawing, the wheel hub is indicated by the numeral 5 and secured to the ends thereof are hub plates 6. These plates are circular in form and are held spaced apart a distance equal to the length of the hub. The hub 5 is of considerable less diameter than the hub plates 6 and is concentric with respect thereto. A number of radial arms 7 are formed upon the hub 5 as clearly illustrated in Fig. 1 of the drawing and the outer ends of these arms terminate considerably short of the peripheries of the hub plates 6.

The rim of the wheel is indicated by the numeral 8 and constitutes the tire and felly of the wheel. Annular sheet metal strengthening bands 9 are secured upon opposite sides of the rim 8 and serve to prevent distortion of the rim and prevent warping should it be made of wood or other material liable to be thus affected.

The spokes of the wheel are resilient, as before stated, and are secured at their inner straight ends 13 to the arms 7 in a manner to be presently explained, and at their outer ends 7', which are concentric to the rim 9, and are secured to the inner side of the rim. Each of these spokes is formed from a length of flat resilient strip metal bent to convoluted form as illustrated in Fig. 1 of the drawing, the convolutions of these spokes being indicated by the numeral 10. It will be observed from an inspection of said Fig. 1 of the drawing that the convolutions 10 decrease in width toward the inner ends of the spokes and that the bends forming the convolutions are in radial alinement, in the instance of each spoke so that the spoke as a whole may be said to taper from its outer to its inner end. The outermost convolution of each spoke is secured directly against the inner side of the rim 8, there being a flattened plate 11 disposed over the said convolution or outer end of each spoke to which said plate and the said end of the spoke are fast the securing bolts 12, these bolts being of course secured to the rim 8. Each spoke, at its inner end, beyond its innermost convolution 10, is extended directly radially inwardly as at 13 and secured to one of the arms 7. It will be observed that the inner portion of each spoke is confined between the hub plates 6 at their portions which project beyond the circumferential surface of the hub 5. It will further be understood from an inspection of Fig. 2 of the drawing that the spokes are of a width equal to the distance between the hub plates.

From the foregoing description of the invention it will be readily understood that inasmuch as the outer portions of the spokes are not confined between the hub plates 6, the rim of the wheel may yield laterally with respect to the hub thereof as well as radially. Further it will be understood that owing to the fact that the convolutions of the spokes decrease in width toward the inner ends of the spokes, the spokes are rendered more sensitive to shocks than the straight wire or wood spokes and consequently act more efficiently to absorb shocks.

What is claimed is:

A spring wheel, having a disk hub with opposed faces parallel, a plurality of arms, L-shaped in cross section, extending radially from the periphery of the disk hub, a rim, a plurality of spokes each made from a single ribbon of metal and bent to have a rim paralleling and engaging terminal, and a plurality of intermediate convolutions gradually reduced in length from the rim end toward and terminating in a straight arm engaging terminal, said arm engaging terminal being disposed radially of the wheel and in a line centrally of the convolutions of the spokes, bolts passing through each arm engaging terminal and its arm to attach the spoke to the hubs, and two circular plates disposed upon opposite sides and secured to the parallel faces of the disk hub, said plates extending to incase the arms and approximately one-half of each spoke.

In testimony that I claim the foregoing as my own, I have hereto affixed my signature in the presence of two witnesses.

LUDIA H. HODGES.

Witnesses:
J. W. ASKEY,
W. A. BURSON.

Copies of this patent may be obtained for five cents each, by addressing the "Commissioner of Patents, Washington, D. C."